US011947365B2

(12) United States Patent
Polega (10) Patent No.: US 11,947,365 B2
(45) Date of Patent: Apr. 2, 2024

(54) LAST MILE MULTI-TRANSPORTATION DELIVERY SYSTEM

(71) Applicant: Saudi Arabian Oil Company, Dhahran (SA)

(72) Inventor: Timothy Polega, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 331 days.

(21) Appl. No.: 16/935,366

(22) Filed: Jul. 22, 2020

(65) Prior Publication Data
US 2022/0026926 A1    Jan. 27, 2022

(51) Int. Cl.
| G05D 1/10 | (2006.01) |
| B60W 60/00 | (2020.01) |
| G05D 1/00 | (2006.01) |
| G05D 1/12 | (2006.01) |
| G06Q 10/0835 | (2023.01) |
| G06Q 20/14 | (2012.01) |

(52) U.S. Cl.
CPC ......... *G05D 1/106* (2019.05); *B60W 60/0025* (2020.02); *G05D 1/12* (2013.01); *G06Q 10/08355* (2013.01); *G06Q 20/145* (2013.01)

(58) Field of Classification Search
CPC ..... G05D 1/106; G05D 1/12; B60W 60/0025; G06Q 10/08355; G06Q 20/145
USPC .......................................................... 701/16
See application file for complete search history.

(56) References Cited

U.S. PATENT DOCUMENTS

| 9,786,187 | B1* | 10/2017 | Bar-Zeev | G08G 5/0043 |
| 10,026,054 | B1* | 7/2018 | Staton | B65D 25/00 |
| 10,625,859 | B2* | 4/2020 | Beckman | G06Q 10/08345 |
| 11,157,867 | B1* | 10/2021 | Jordan | B64C 39/024 |
| 2013/0261914 | A1* | 10/2013 | Ingram | B64D 27/24 |
| | | | | 701/423 |
| 2015/0363717 | A1* | 12/2015 | Lim | G06Q 10/10 |
| | | | | 705/4 |

(Continued)

OTHER PUBLICATIONS

PCT International Search Report and Written Opinion in International Appln. No. PCT/US2021/042596, dated Oct. 18, 2021, 14 pages.

*Primary Examiner* — Hunter B Lonsberry
*Assistant Examiner* — Robert Louis Pinkerton
(74) *Attorney, Agent, or Firm* — Fish & Richardson P.C.

(57) ABSTRACT

Disclosed are methods, systems, and computer-readable medium to perform operations including: registering one or more aerial vehicles and one or more land-based vehicles with a last mile delivery system, where the one or more aerial vehicles and the one or more land-based vehicles are associated with aerial vehicle information and land-based vehicle information, respectively; determining to generate a land-based vehicle transportation request for a first aerial vehicle that is performing a delivery; matching, based on the land-based vehicle transportation request and the land-based vehicle information, the first aerial vehicle with a first land-based vehicle; and generating and sending transportation instructions to the first aerial vehicle and the first land-based vehicle, where the transportation instructions include: (i) a starting location where the first aerial vehicle docks to the first land-based vehicle, and (ii) a destination to which the first land-based vehicle transports the first aerial vehicle.

20 Claims, 5 Drawing Sheets

(56) References Cited

U.S. PATENT DOCUMENTS

| | | | |
|---|---|---|---|
| 2016/0210591 A1* | 7/2016 | Lafrance | G06Q 10/047 |
| 2018/0016027 A1* | 1/2018 | Cheatham, III | B64U 10/25 |
| 2019/0012636 A1* | 1/2019 | Simon | G01C 21/3423 |
| 2019/0043370 A1* | 2/2019 | Mulhall | B64F 1/32 |
| 2019/0114564 A1* | 4/2019 | Ferguson | G06Q 10/06312 |
| 2019/0164113 A1* | 5/2019 | Fosgard | G05D 1/0225 |
| 2019/0221127 A1* | 7/2019 | Shannon | G06Q 10/08 |
| 2020/0019925 A1* | 1/2020 | Tokhtabaev | B64D 9/00 |
| 2020/0050188 A1* | 2/2020 | Bash | B64D 25/00 |
| 2020/0066154 A1* | 2/2020 | O'Sullivan | G06Q 10/00 |
| 2020/0233411 A1* | 7/2020 | Ivanov | G05D 1/104 |
| 2020/0354057 A1* | 11/2020 | Polus | B64D 1/22 |
| 2020/0356114 A1* | 11/2020 | Uçar | G08G 5/0021 |
| 2020/0363825 A1* | 11/2020 | Aoki | G08G 1/137 |
| 2021/0080967 A1* | 3/2021 | Pettinger | B60W 30/095 |
| 2022/0101256 A1* | 3/2022 | Lee | G06Q 10/0834 |

* cited by examiner

LAST MILE MULTI-TRANSPORTATION DELIVERY SYSTEM

TECHNICAL FIELD

This disclosure relates to a last mile intermodal delivery system.

BACKGROUND

Unmanned aerial vehicles (UAVs) are vehicles that are capable of travel without a human operator that is physically present in the vehicle. UAVs are utilized for many commercial uses. One use in which UAVs are increasingly being utilized is delivery operations. In delivery operations, a fleet of UAVs is used to deliver goods from warehouses to delivery locations. This type of delivery operation that involves movement of goods from a transportation hub to a delivery destination is referred to as last mile delivery.

SUMMARY

Although using UAVs for last mile delivery has many advantages, existing UAV delivery systems have limitations that prevent the widespread adoption of using UAVs for last mile deliveries. For example, UAVs have limited range, speed, and weight capacity. Additionally, UAVs can generally operate only in ideal conditions. As such, UAVs cannot be used for delivery during non-ideal conditions, such as inclement weather.

Disclosed herein is a last mile multi-transportation delivery system (LMDS) that overcomes the existing challenges of last mile delivery. In an embodiment, the LMDS coordinates between land-based transportation providers and aerial transportation providers. After communicating with the providers to register land-based vehicles and UAVs, the LMDS determines to generate a land-based transportation request for one of the registered UAVs that is performing a delivery. The LMDS matches the UAV with a land-based vehicle that can fulfill the UAV's land-based transportation request. The LMDS provides the UAV with transportation information that allows the UAV to locate and dock to the land-based vehicle, perhaps using a specialized UAV carrier attached to the vehicle. The land-based vehicle then transports the UAV to an agreed upon destination.

Aspects of the subject matter described in this specification may be embodied in methods that include the actions of: registering one or more aerial vehicles and one or more land-based vehicles with a last mile delivery system, where the one or more aerial vehicles and the one or more land-based vehicles are associated with aerial vehicle information and land-based vehicle information, respectively; determining to generate a land-based vehicle transportation request for a first aerial vehicle that is performing a delivery; matching, based on the land-based vehicle transportation request and the land-based vehicle information, the first aerial vehicle with a first land-based vehicle; and generating and sending transportation instructions to the first aerial vehicle and the first land-based vehicle, where the transportation instructions include: (i) a starting location where the first aerial vehicle docks to the first land-based vehicle, and (ii) a destination to which the first land-based vehicle transports the first aerial vehicle.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, determining to generate a land-based vehicle transportation request for a first aerial vehicle that is performing a delivery involves receiving a request for transportation from the first aerial vehicle.

In some implementations, determining to generate a land-based vehicle transportation request for a first aerial vehicle that is performing a delivery involves determining, based on an analysis of the aerial vehicle information, to generate the land-based vehicle transportation request.

In some implementations, the land-based vehicle information includes, for each of the one or more land-based vehicles, at least one of: a vehicle profile, a real-time location, a destination, or a planned route information.

In some implementations, the aerial vehicle information includes, for each of the one or more aerial vehicles, at least one of: an aerial vehicle profile, a real-time location, a destination, a planned route information, a range of the aerial vehicle, a speed of the aerial vehicle, and a weight capacity of the aerial vehicle.

In some implementations, the method further involves generating, by a billing system, a bill for an operator of the first aerial vehicle for the transportation of the first aerial vehicle to the destination by the first land-based vehicle.

In some implementations, the method further involves receiving, from an operator of the first aerial vehicle, a rating associated with the first land-based vehicle.

The subject matter described in this specification can be implemented to realize one or more of the following advantages. Existing land-based and aerial delivery systems are standalone systems. Such standalone systems have many limitations that prevent the widespread adoption of using UAVs for last mile delivery. The disclosed LMDS combines land-based and aerial delivery systems in order to overcome the limitations of existing delivery systems. In particular, the disclosed LMDS increases the range, speed, weight capacity, alternative manual package delivery, emergency recovery, and safety of last mile UAV delivery. Additionally, by combining land-based and aerial delivery systems, the LMDS improves the efficiency and reliability of delivery systems. In addition to reducing the consumption of computing resources, more efficient and reliable systems improve customer satisfaction.

The details of one or more implementations of the subject matter of this specification are set forth in the Detailed Description, the accompanying drawings, and the claims. Other features, aspects, and advantages of the subject matter will become apparent from the description, the claims, and the accompanying drawings.

DETAILED DESCRIPTION

This disclosure describes a last mile multi-transportation delivery system (LMDS) that coordinates between land-based transportation providers and aerial transportation providers. The LMDS includes a registration system that communicates with the providers to register land-based vehicles and unmanned aerial vehicles (UAVs). The LMDS also includes a booking system that generates a land-based transportation request for one of the registered UAVs that is performing a delivery. The land-based transportation request is a request for a UAV to be transported by a land-based vehicle for a segment(s) partially or all the way to a destination. The booking system matches the UAV with an available land-based vehicle that can fulfill in total or part the land-based transportation request. The LMDS provides the UAV with information that allows the UAV to locate and dock to the land-based vehicle (for example, docking to a carrier attached to the vehicle). The land-based vehicle then transports the UAV to the destination. The LMDS also includes a billing system that coordinates billing and payment for the UAV transportation. The LIVID S also includes a rating system that enables the land-based vehicles and the UAVs to be rated.

Figure 1:
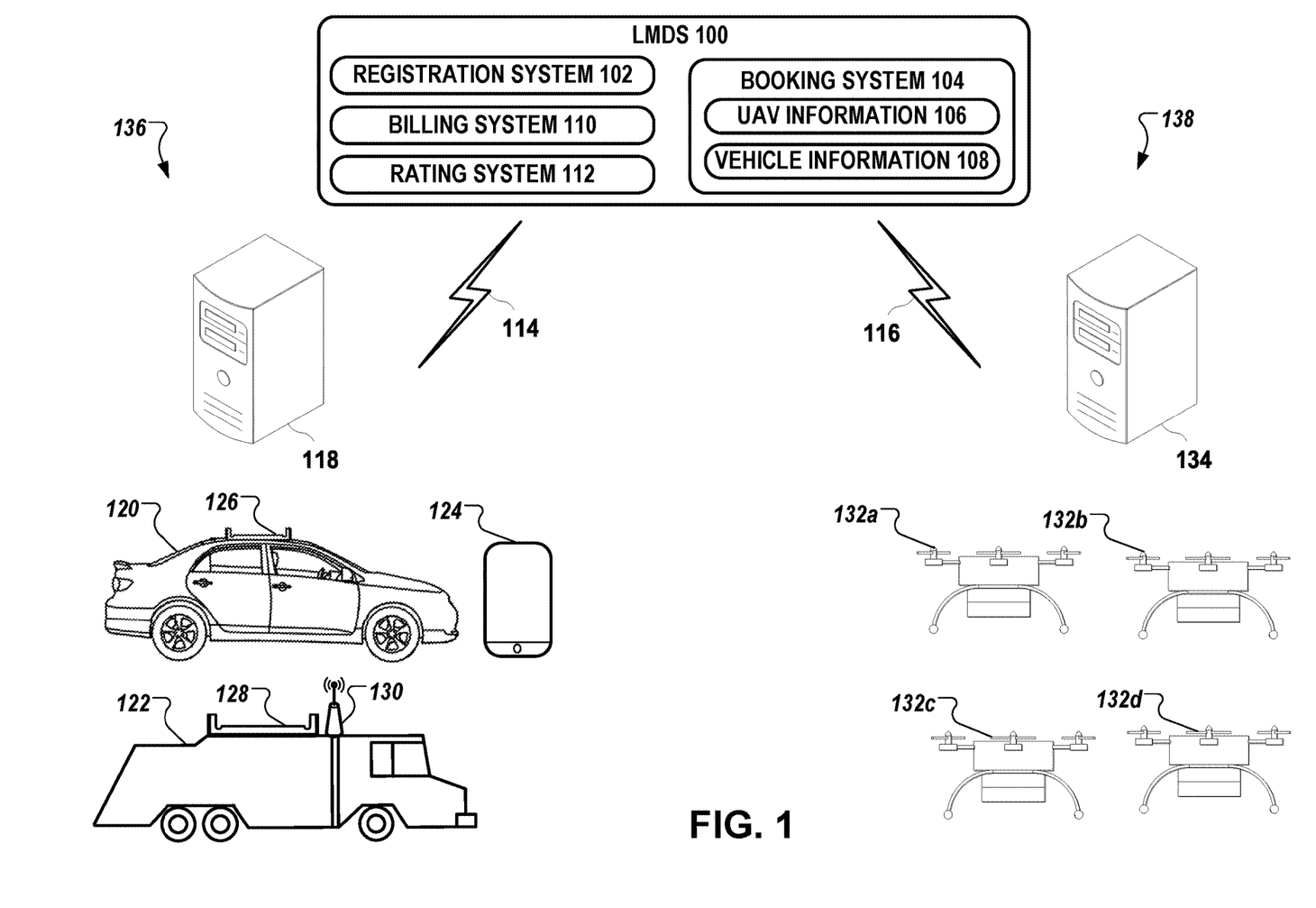
FIG. 1 illustrates an example last-mile multi-transportation delivery system (LMDS), according to some implementations of the present disclosure.

FIG. 1 illustrates an example last-mile multi-transportation delivery system (LMDS) 100, according to some implementations. As shown in FIG. 1, the LMDS 100 includes registration system 102, booking system 104, billing system 110, and rating system 112. The LMDS 100 provides a combined land-based vehicle and UAV transportation infrastructure for last mile deliveries. Specifically, the LMDS 100 coordinates between land-based transportation providers 136 and aerial transportation providers 138 in order to book land-based vehicles to provide transportation (e.g., "hitch-hiking") services to UAVs. As shown in FIG. 1, the LMDS communicates with the land-based transportation providers 136 and the aerial transportation providers 138 via networks 114, 116, respectively.

In an embodiment, the land-based transportation providers 136 include a land-based vehicle server 118 and land-based vehicles 120, 122. The land-based vehicle server 118 is associated with one or more land-based vehicle operators, such as autonomous vehicle operators, shipping companies, passenger transportation companies, ride-sharing companies, and delivery companies. A land-based vehicle operator manages or operates one or more fleets of land-based vehicles. Land-based vehicles include any land-based means of transportation (of passengers or goods) that is powered by a combustion engine or an electric motor, such as automobiles, trains, locomotives, motorcycles, and trucks. A fleet of land-based vehicles may include vehicles that are dedicated for UAV transportation and vehicles that are not dedicated for UAV transportation. Vehicles that are dedicated for UAV transportation include a carrier that is configured to securely hold a UAV during transit. In some examples, the dedicated vehicles follow predetermined routes in order to provide UAVs with convenient access to transportation services.

In an embodiment, the land-based vehicle server 118 communicates with vehicles that it manages in order to send instructions, such as trip information and routes. The trip information includes a point of origin, a destination, and a route between the point of origin and the destination. Additionally, the land-based vehicle server 118 communicates with vehicles in order to receive data from the vehicles. For example, the land-based vehicle server 118 receives identification information, location information, trip information, and requests (for example, to enroll in a UAV transportation service).

The land-based vehicles 120, 122 may be independent vehicles (that is, not associated with a vehicle operator) or may be associated with a vehicle operator. Furthermore, land-based vehicles 120, 122 may operate autonomously or may be controlled by an operator (for example, a driver). In the example of FIG. 1, land-based vehicle 120 is operated by a driver and land-based vehicle 122 is an autonomous vehicle. Additionally, as shown in FIG. 1, the land-based vehicles 120, 122 may include aerial vehicle carriers 126, 128, respectively. The aerial vehicle carriers 126, 128 are attached to the vehicles and serve as a docking location for UAVs. In order to communicate with the land-based vehicles 120, 122, the LMDS 100 can communicate with a mobile computing device of a driver of the vehicle or with a computing device of the vehicle itself. For example, to communicate with the land-based vehicle 120, the LMDS 100 communicates with mobile device 124, which is operated by a driver or passenger of the land-based vehicle 120. And to communicate with the land-based vehicle 122, the LMDS 100 communicates with a computing device 130 of the land-based vehicle 122. Alternatively, if the land-based vehicles 120, 122 are operated by the land-based vehicle server 118, the LMDS 100 can communicate with the land-based vehicles 120, 122 via the land-based vehicle server 118.

In an embodiment, the land-based transportation providers 136 register one or more vehicles with the LMDS 100. In an example, a land-based transportation provider registers a vehicle by providing registration information to the LMDS 100 via the network 114. The registration information includes one or more identifiers of the vehicle, such as a vehicle identification number (VIN), a license plate, a vehicle make, and vehicle model. The registration information may also include official documents, such as vehicle registration and insurance information. Also, the registration information may include geographic information indicative of the areas where the vehicle operates, such as city, county, or zip code. If the vehicle is a delivery vehicle that follows a particular route, the registration information may include information indicative of the particular route. Further, the registration information indicates whether the vehicle follows guaranteed routes. Yet further, the registration information may include billing and payment information.

Furthermore, the registration information indicates whether the vehicle is equipped with a specialized carrier (for example, aerial vehicle carriers 126, 128) for UAVs (even if the vehicle is not dedicated to solely transporting UAVs). If the vehicle is not equipped with a carrier, the registration information may include a request for a carrier to be installed on the vehicle. Additionally, the registration information indicates whether the vehicle can charge batteries of docked UAVs and whether the vehicle (or a driver or passenger of the vehicle) can manually pick up UAVs. Manually picking up a UAV may involve a robotic picker (or a driver) picking up the UAV and placing the UAV within the vehicle so that the UAV can be transported to a destination. In examples where the vehicle is operated by an individual, the registration information may include a driving history, a credit worthiness, ride-share rating, and referrals or driving feedback.

Upon receipt of the registration information of a vehicle by the LMDS 100, the registration system 102 analyzes the registration information in order to determine whether the vehicle qualifies to be enrolled for UAV transportation. In an example, the registration system 102 uses one or more metrics to evaluate the vehicle and generate an evaluation score for the vehicle. If the evaluation score is less than a threshold, then the registration of the vehicle is denied, and the LMDS 100 sends the relevant land-based transportation provider an indication of the denial. In some examples, the vehicle may be flagged for further review, perhaps by a human reviewer. If the evaluation score is greater than the threshold, then the vehicle is approved for registration.

Once the vehicle is approved, the registration system 102 creates a profile for the vehicle. The profile of the vehicle may include the registration information that was provided to the registration system 102. Additionally, the vehicle profile may include the billing and payment information associated with the vehicle. The vehicle profile is encrypted and securely stored by the LMDS 100.

Additionally, the registration system 102 may determine whether additional steps are required before the vehicle can be scheduled for transporting UAVs. As an example, the registration system 102 may need additional information from the vehicle. As another example, the registration system 102 may determine that the registration information includes a request for an aerial vehicle carrier. In response, the registration system 102 facilitates for a carrier to be installed on the vehicle (for example, by shipping a carrier to an owner of the vehicle or by scheduling the vehicle for an installation appointment at designated installation locations).

In an embodiment, the aerial transportation providers 138 include a UAV server 134 and UAVs 132a, 132b, 132c, 132d. The UAV server 134 is associated with one or more UAV operators, such as shipping companies, e-commerce companies, retail companies, and delivery companies. A UAV operator manages or operates one or more fleets of UAVs. A UAV is any vehicle that provides means of aerial transportation. A UAV includes a propulsion system for propelling, maneuvering, directional control, and altitude control. Among other components, a propulsion system includes motors, shafts, and propellers. Additionally, a UAV includes a payload delivery system. The payload delivery system includes means for picking up, securely storing during transit, and delivering one or more items. A UAV may operate autonomously or may be controlled by an operator via remote control.

In an embodiment, the UAV server 134 communicates with UAVs 132a, 132b, 132c, 132d that it operates in order to send instructions, such as trip information and routes. The trip information includes a point of origin, a destination, and a route between the point of origin and the destination. Additionally, the UAV server 134 communicates with UAVs 132a, 132b, 132c, 132d in order to receive data from the UAVs 132a, 132b, 132c, 132d. For example, the UAV server 134 receives identification information, UAV specifications, location information (for example, in real-time), and trip information.

The UAVs 132a, 132b, 132c, 132d may be independently owned and operated, or may be managed or operated by a UAV operator. For example, the UAVs 132a, 132b, 132c, 132d may be part of an UAV delivery fleet for delivering items from a point of origin (for example, a transportation hub or warehouse) to a destination (for example, residential locations). The UAVs 132a, 132b, 132c, 132d may include specialized mounting systems that allow the UAVs 132a, 132b, 132c, 132d to dock to specialized carriers (for example, aerial vehicle carriers 126, 128). In order to communicate with the UAVs 132a, 132b, 132c, 132d, the LIVID S 100 can communicate with the UAVs 132a, 132b, 132c, 132d directly via the network 116. Alternatively, if the UAVs 132a, 132b, 132c, 132d are operated by the UAV server 134, the LMDS 100 can communicate with the land-based vehicles 120, 122 via the UAV server 134.

In an embodiment, the aerial transportation providers 138 register with the LMDS 100 one or more of the UAVs. In an example, an aerial transportation provider registers a UAV by providing registration information to the LMDS 100 via the network 116. The registration information includes one or more identifiers of the UAV, such as a serial number, a model, and aesthetic details (for example, color). The registration information may also include formal documents, such as insurance or flight license information. Also, the registration information may include geographic information indicative of the areas where the UAV operates, such as city, county, or zip code. Furthermore, the registration information includes features of the UAV, such as speed, weight limit, payload size, battery details (for example, charging time, capacity, and health), and range. Note that, in some examples, an aerial transportation provider, such as the UAV server 134, can send the registration information of a plurality of vehicles at the same time (for example, for a fleet of UAVs).

Upon receipt of the registration information of a UAV, the registration system 102 analyzes the information in order to determine whether the UAV qualifies to be enrolled for UAV transportation. In an example, the registration system 102 uses one or more metrics to evaluate the UAV and to generate an evaluation score for the UAV. If the evaluation score is less than a threshold, then the registration of the UAV is denied, and the LMDS 100 sends the relevant aerial transportation provider an indication of the denial. In some examples, the UAV may be flagged for further review or analysis (for example, for review by a human reviewer). If the evaluation score is greater than the threshold, then the UAV is approved.

Once the UAV is approved, the registration system 102 creates a profile for the UAV. The profile of the UAV may include the registration information that was provided to the registration system 102. Additionally, the UAV profile may include the billing and payment information associated with the UAV. The UAV profile is encrypted and securely stored by the LMDS 100.

In an embodiment, once a vehicle or a UAV is registered with the LMDS 100, the LMDS 100 periodically or continuously receives information associated with the vehicle or the UAV required to coordinate "hitchhiking". Specifically, the booking system 104 receives the information as UAV information 106 and vehicle information 108. The UAV information 106 may include real-time location, trip information (for example, point of origin, destination, and planned route), payload information (for example, weight and size of the payload), total weight of the UAV (including the payload), battery status (for example, charge level), expected remaining range, among other information. The vehicle information 108 includes real-time location and trip information (for example, point of origin, destination, planned route, and estimated trip time). Additionally, the UAV information 106 includes the UAV profiles of registered UAVs, and the vehicle information 108 includes the vehicle profiles of registered vehicles. Note that, in some embodiments, the LMDS 100 could limit access to information that is relevant to the trip or portion of the trip involving both the UAV and land-based transportation. As such, the LMDS 100 further protects the UAV information 106 and vehicle information 108.

In an embodiment, the booking system 104 determines to generate a transportation request for a registered UAV. The registered UAV may be delivering a payload or may be in need of transportation for repair, maintenance, or recharging. The transportation request includes trip information and a profile of the registered UAV. The trip information includes a destination of the UAV, such as a delivery destination or a recharging station. In an example, the booking system 104 determines to generate the transportation request in response to receiving a request for transportation from the UAV. The UAV may send the request in response to determining that: (i) a battery of the UAV is less than a threshold (for example, depleted or nearly depleted), (ii) a battery of the UAV may be less than a threshold prior to or shortly after delivering the payload, (iii) weather conditions may hamper the delivery, (iv) the UAV may be out of range of its controller along the delivery route, (v) the delivery route passes through an area where the UAV is not authorized to operate (for example, in restricted zones near airports), (vi) there is traffic along the delivery route, (vi) the UAV is in a conservation mode in which UAV resources are conserved, (vii) that the UAV to request that the land-based transportation to make the final delivery of the UAV package, or (viii) that the UAV is in need of transportation for repair, maintenance, or recharging. In some examples, the UAV sends the request in response to detecting an emergency or malfunction.

In another example, the booking system 104 determines to generate the transportation request based on an analysis of the UAV information 106. The booking system 104 may, for instance, analyze the UAV information in real-time. Based on the analysis of the UAV information 106, the booking system 104 determines that: (i) a battery of the UAV is less than a threshold, (ii) a battery of the UAV may be less than a threshold prior to or shortly after delivering the payload, (iii) weather conditions may hamper the delivery, (iv) the UAV may be out of range of its controller along the delivery route, (v) the delivery route passes through an area where the UAV is not authorized to operate (for example, in restricted zones near airports), (vi) there is traffic along the delivery route, (vi) the UAV is in a conservation mode in which UAV resources are conserved, or (vii) it is more efficient for the UAV to be transported by a vehicle. In response to the determination, the booking system 104 generate the transportation request.

In an embodiment, the booking system 104, in response to generating the transportation request, analyzes the vehicle information 108 in order to select one or more available vehicles that can fulfill the transportation request. In particular, the booking system 104 analyzes the location information, trip information, and vehicle profiles of the available vehicles in order to select the one or more vehicles. Based on the analysis of the vehicle information, the booking system 104 selects the one or more available vehicles that can fulfill the transportation request. For example, the UAV's route to a destination, or a portion of the route, may overlap with the one or more available vehicles' respective routes. The booking system 104 can then send the transportation request to one of the selected vehicles.

In an example, if more than one vehicle is selected, the booking system 104 can assign a score to each vehicle, where the score indicates a vehicle's match to the transportation request. The booking system 104 can then send the request to the highest scored vehicle. If the vehicle does not accept the request, the booking system 104 can send the request to the next highest scored vehicle, and so on, until a vehicle accepts the request.

In an embodiment, a vehicle receives the transportation request via a computing device (for example, the mobile device 124 or a computing device of the vehicle). The computing device or a user of the computing device, such as a driver or passenger, may accept or decline the request. The response is sent to the booking system 104. If the vehicle has declined the request, the booking system 104 selects another vehicle to which to send the request. Conversely, if the vehicle has accepted the request, then the booking system 104 sends transportation information to the UAV. The transportation information includes identifying information and trip information of the vehicle. In some examples, the booking system 104 may also provide the UAV with a real-time location of the vehicle. In other examples, the booking system 104 may determine a docking location at which the UAV and the vehicle meet so that the UAV can safely dock into a carrier attached to the vehicle.

Note that, in some examples, a land-based vehicle may transport more than one UAV simultaneously, and that the LMDS 100 may coordinate the travel plans of the more than one UAV. Additionally, the UAV request will generally not require the land-based transportation to make any changes in its original travel plans. In some instances, the land-based transportation may adjust its transportation plans after accepting a UAV request. In yet other instances, the UAV may request the land-based transportation to make a special trip just for the UAV.

In an embodiment, the booking system 104 assigns portions of the transportation request to different land-based vehicle. In this embodiment, a first leg of the trip is assigned to a first land-based vehicle, a second leg of the trip is assigned to a second land-based vehicle, and so on. Accordingly, the booking system 104 can assign any number of vehicles to a transportation request, where each vehicle fulfills a portion of the transportation request. As such, many of the UAVs request will not require the land-based transportation to make any changes in its original travel plans. The UAV may jump from one land-based transportation vehicle to another (for example, changing land-based vehicles at an intersection).

In an embodiment, if the booking system 104 is unable to assign the transportation request to an available vehicle, then the booking system 104 operates a land-based vehicle hailing service to broadcast the transportation request to vehicles that are not registered with the LMDS 100. For example, the land-based vehicle hailing service broadcasts the request to vehicles that are in the vicinity of the UAV. As such, the land-based vehicle hailing service coordinates between the UAV and vehicles that are not registered in order to book a vehicle to provide transportation to the UAV.

In an embodiment, the billing system 110 is responsible for billing and payments for the services performed by the LMDS 100. The billing system 110 may implement different payment and subscription methods. For example, a registered UAV may be billed for services on a per-use basis or based on a subscription plan. In some examples, the cost for the services may be based on several factors, including: transportation distance, total weight of UAV, whether the land-based vehicle adjusted its travel plan in order to fulfill the UAV request, and whether the land-based vehicle made a special trip just for the UAV. If the registered UAV is part of a corporate fleet, the billing system 110 may generate a single bill for the services used by the corporate fleet. Additionally, the billing system 110 provides payments to a land-based transportation provider for services performed by the vehicle(s) of the provider.

In an embodiment, the rating system 112 allows the aerial transportation providers 138 to rate the transportation services provided by the land-based transportation providers 136. In particular, the rating may be based on timeliness, efficiency, driver performance, accident history, damages to the UAV or a payload, among other examples. The rating of the vehicle or land-based transportation provider may be stored in the relevant vehicle profile. Similarly, the rating system 112 allows the land-based transportation providers 136 to rate the UAVs.

The networks 114, 116 may include wired connections, wireless connections, or both. The connections may include the Internet, an intranet, a cellular telephone network, a wireless local area network (WLAN), a metropolitan area network (MAN), a satellite constellation network, or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), a 5G network, Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP), or any other suitable communication protocol.

Figure 2A:
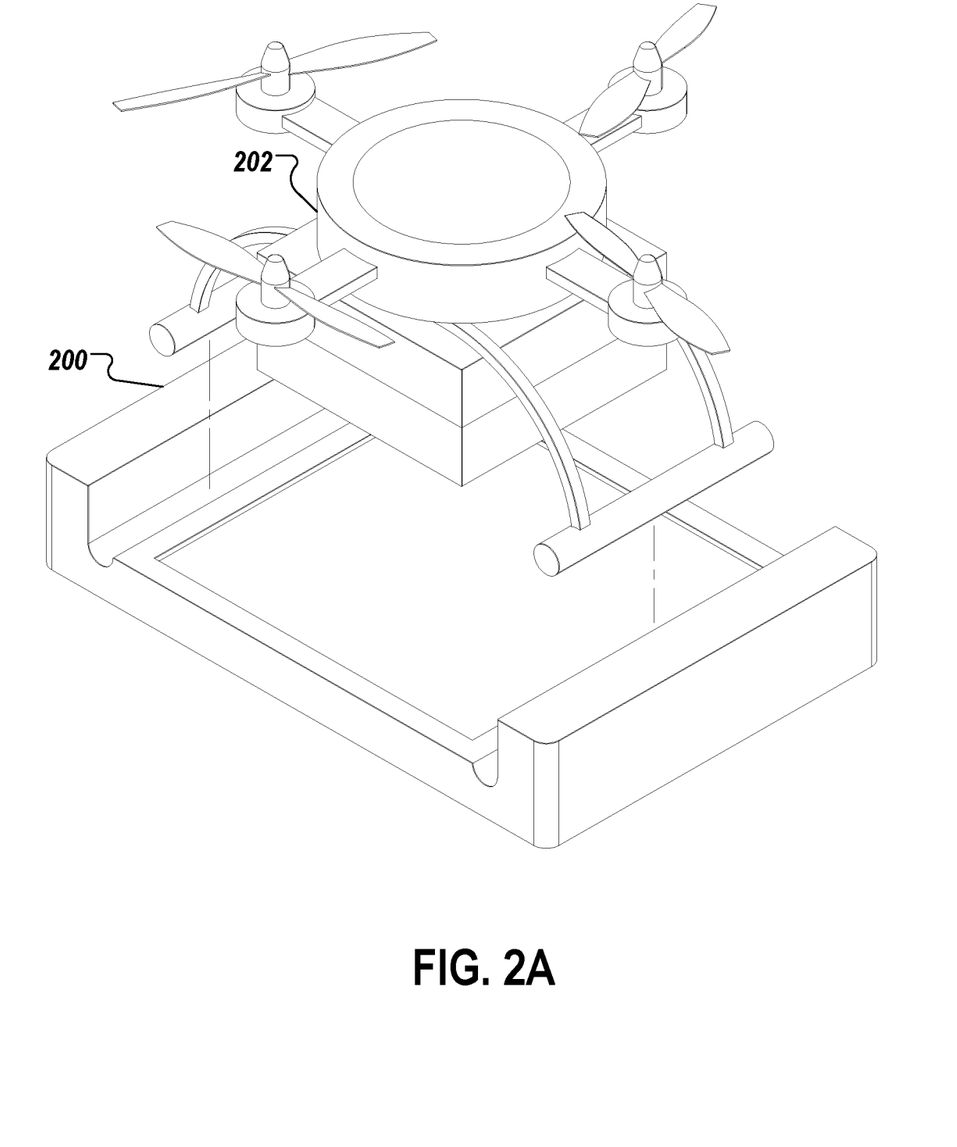
FIG. 2A and FIG. 2B illustrate an example aerial vehicle carrier, according to some implementations of the present disclosure.
Figure 2B:
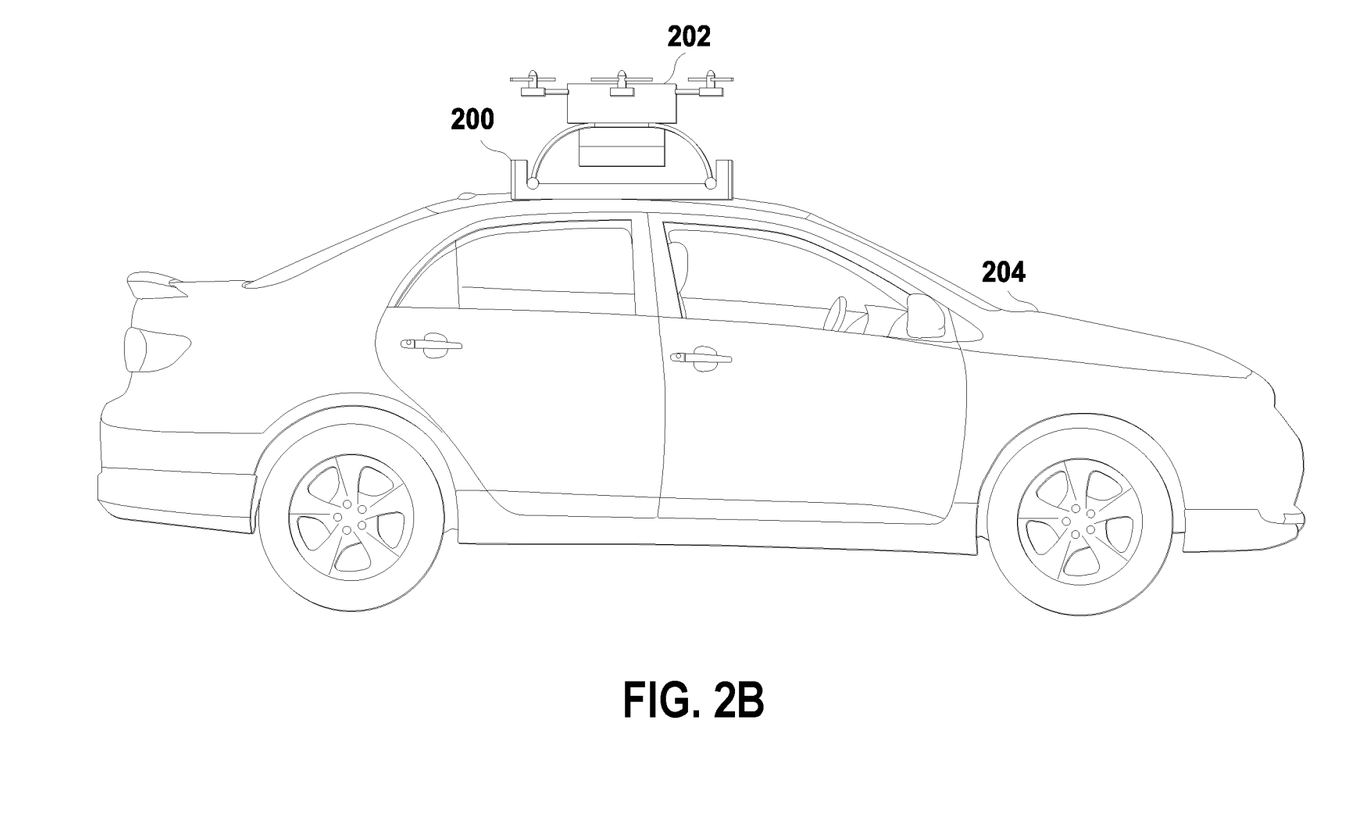

FIG. 2A and FIG. 2B illustrate an example aerial vehicle carrier 200, according to some implementations. As shown in FIG. 2A, the aerial vehicle carrier 200 is configured to receive and securely dock a UAV 202. And as shown in FIG. 2B, the aerial vehicle carrier 200 can be attached to a land-based vehicle 204. In some examples, the aerial vehicle carrier 200 may be configured to recharge a battery of the UAV 202 using a wired or wireless connection. In these examples, the aerial vehicle carrier 200 may include a wired or wireless charger.

Figure 3:
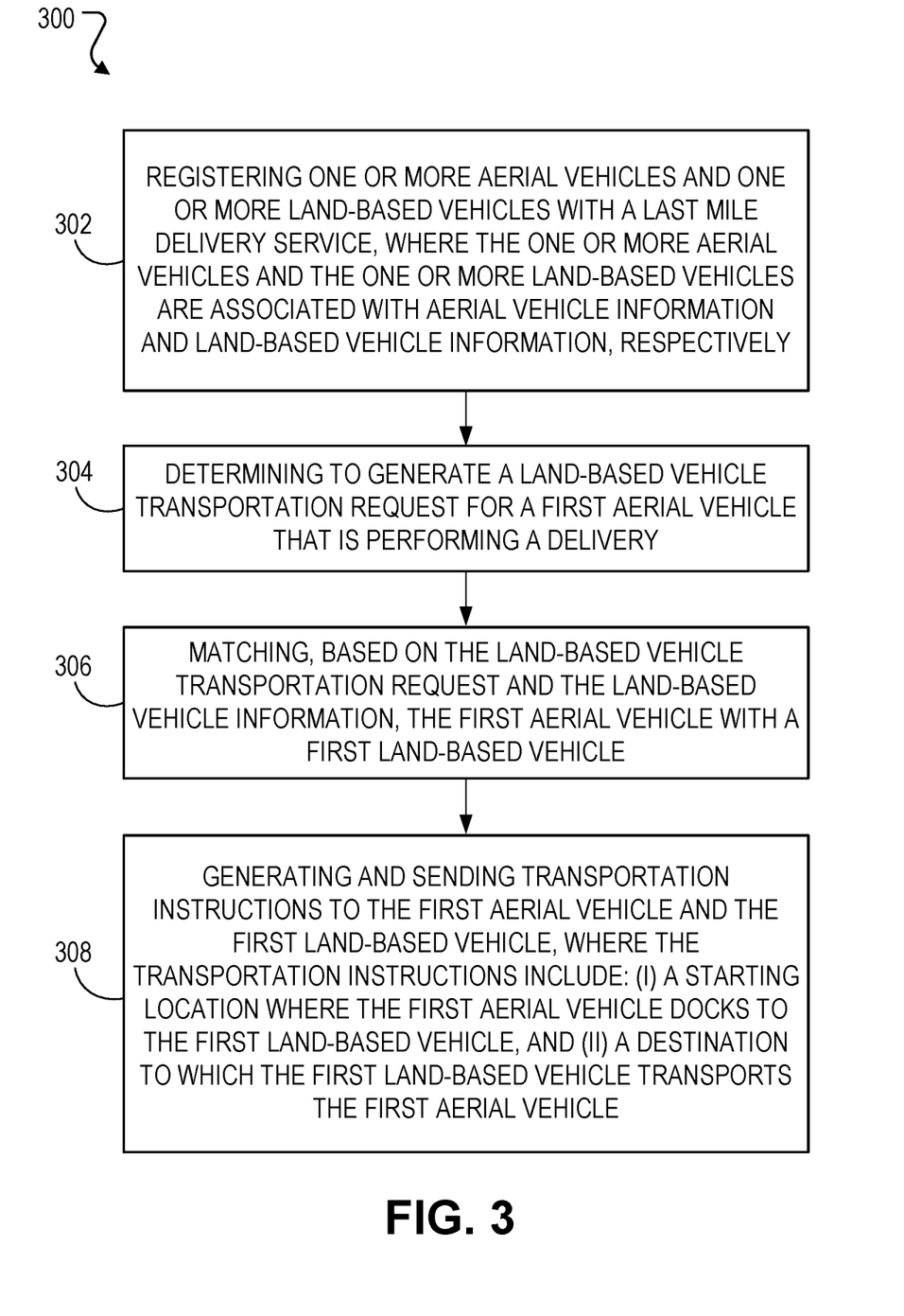
FIG. 3 illustrates a flow chart of an example process, according to some implementations of the present disclosure.
Figure 4:
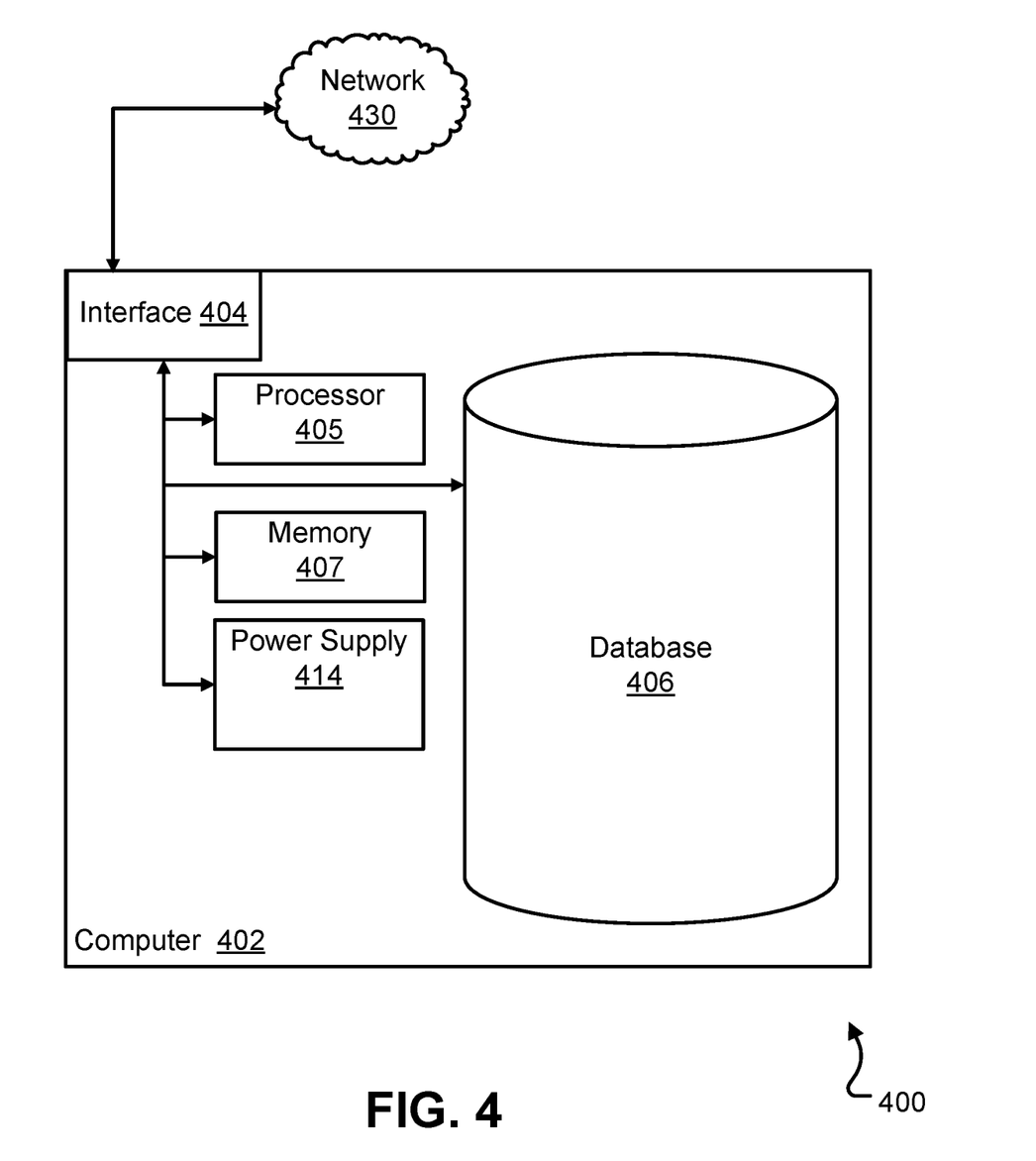
FIG. 4 illustrates a block diagram of an example computing system, according to some implementations of the present disclosure.

FIG. 3 is a flowchart of an example method 300 for booking land-based transportation for a UAV that is performing a delivery. For clarity of presentation, the description that follows generally describes method 300 in the context of the other figures in this description. However, it will be understood that method 300 can be performed by any suitable system, environment, software, and hardware, or a combination of systems, environments, software, and hardware as appropriate. For example, the computer system 400 can be used to implement the method 300. In some implementations, various steps of method 300 can be run in parallel, in combination, in loops, or in any order.

At step 302, the method 300 involves registering one or more aerial vehicles and one or more land-based vehicles with a last mile delivery service, where the one or more aerial vehicles and the one or more land-based vehicles are associated with aerial vehicle information and land-based vehicle information, respectively. In an example, the last mile delivery service is provided by the LMDS 100 of FIG. 1. Further, the one or more aerial vehicles may be similar or identical to the UAVs 132a, 132b, 132c, and 132d, and the one or more land-based vehicles may be similar or identical to the land-based vehicles 120, 122 of FIG. 1. Yet further, the registration system 102 of FIG. 1 may perform the registration of the one or more aerial vehicles and the one or more land-based vehicles.

At step 304, the method 300 involves determining to generate a land-based vehicle transportation request for a first aerial vehicle that is performing a delivery.

At step 306, the method 300 involves matching, based on the land-based vehicle transportation request and the land-based vehicle information, the first aerial vehicle with a first land-based vehicle.

At step 308, the method 300 involves generating and sending transportation instructions to the first aerial vehicle and the first land-based vehicle, where the transportation instructions include: (i) a starting location where the first aerial vehicle docks to or is manually picked up by the first land-based vehicle and (ii) a destination to which the first land-based vehicle transports the first aerial vehicle.

In some implementations, determining to generate a land-based vehicle transportation request for a first aerial vehicle that is performing a delivery involves receiving a request for transportation from the first aerial vehicle.

In some implementations, determining to generate a land-based vehicle transportation request for a first aerial vehicle that is performing a delivery involves determining, based on an analysis of the aerial vehicle information, to generate the land-based vehicle transportation request.

In some implementations, the land-based vehicle information includes, for each of the one or more land-based vehicles, at least one of: a vehicle profile, a real-time location, a destination, or a planned route information.

In some implementations, the aerial vehicle information includes, for each of the one or more aerial vehicles, at least one of: an aerial vehicle profile, a real-time location, a destination, a planned route information, a range of the aerial vehicle, a speed of the aerial vehicle, and a weight capacity of the aerial vehicle.

In some implementations, the method 300 further involves generating, by a billing system, a bill for an operator of the first aerial vehicle for the transportation of the first aerial vehicle to the destination by the first land-based vehicle.

In some implementations, the method 300 further involves receiving, from an operator of the first aerial vehicle, a rating associated with the first land-based vehicle.

FIG. 4 is a block diagram of an example computer system 400 that can be used to provide computational functionalities associated with described algorithms, methods, functions, processes, flows, and procedures described in the present disclosure, according to some implementations of the present disclosure.

The illustrated computer 402 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 402 can include a Smart Embedded Management Agent (SEMA), such as a built-in ADLINK SEMA 2.2, and a video sync technology, such as Quick Sync Video technology supported by ADLINK MSDK+. In some examples, the computer 402 can include the MXE-5400 Series processor-based fanless embedded computer by ADLINK, though the computer 402 can take other forms or include other components.

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus. In some implementations, any or all of the components of the computer 402, including hardware or software components, can interface with each other or the interface 404 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 402 and other components (whether illustrated or not) that are communicably coupled to the computer 402. The functionality of the computer 402 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 402, in alternative implementations, the API or the service layer can be stand-alone components in relation to other components of the computer 402 and other components communicably coupled to the computer 402. Moreover, any or all parts of the API or the service layer can be implemented as child or sub-modules of another software module, enterprise application, or hardware module without departing from the scope of the present disclosure.

The computer 402 can include an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 can also include a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

An application can be an algorithmic software engine providing functionality according to particular needs, desires, or particular implementations of the computer 402 and the described functionality. For example, an application can serve as one or more components, modules, or applications. Multiple applications can be implemented on the computer 402. Each application can be internal or external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system including computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, a data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file systems can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
registering one or more aerial vehicles and one or more land-based vehicles with a last mile delivery system, wherein the one or more aerial vehicles and the one or more land-based vehicles are associated with aerial vehicle information and land-based vehicle information, respectively;
establishing a first network connection between the last mile delivery system and an aerial vehicle from the one or more aerial vehicles and a second network connection between the last mile delivery system and a land-based vehicle from the one or more land-based vehicles;
determining to generate a land-based vehicle transportation request for a first aerial vehicle that is performing a delivery;
selecting, in response to generating the land-based vehicle transportation request, a first land-based vehicle that accepts the land-based vehicle transportation request to fulfill a request for transportation received from the first aerial vehicle, wherein selecting the first land-based vehicle comprises:
identifying a subset of available vehicles from the one or more land-based vehicles, wherein each vehicle in the subset of available vehicles is available to fulfill the request for transportation received from the first aerial vehicle;
determining, based on the land-based vehicle information for the subset of available vehicles and aerial vehicle information for the first aerial vehicle, a score for each vehicle in the subset of available vehicles, wherein the score for a respective vehicle indicates a likelihood of the respective vehicle to fulfill the land-based vehicle transportation request; and
selecting, based on the scores for the subset of available vehicles, the first land-based vehicle from the subset of available vehicles;
matching, based on the land-based vehicle transportation request and the land-based vehicle information, the first aerial vehicle with the first land-based vehicle; and
generating and sending transportation instructions to the first aerial vehicle and the first land-based vehicle, wherein the transportation instructions comprise: (i) a starting location where the first aerial vehicle docks to the first land-based vehicle, and (ii) a destination to which the first land-based vehicle transports the first aerial vehicle,
wherein the land-based vehicle transportation request causes the first land-based vehicle to transport the first aerial vehicle according to the request for transportation, and
wherein determining to generate the land-based vehicle transportation request for the first aerial vehicle that is performing a delivery comprises:
receiving, over the first network connection, the request for transportation, the request being transmitted from the first aerial vehicle to the last mile delivery system.

2. The computer-implemented method of claim 1, wherein the land-based vehicle information comprises, for each of the one or more land-based vehicles, at least one of: a vehicle profile, a real-time location, a destination, or a planned route information.

3. The computer-implemented method of claim 1, wherein the aerial vehicle information comprises, for each of the one or more aerial vehicles, at least one of: an aerial vehicle profile, a real-time location, a destination, a planned route information, a range of the aerial vehicle, a speed of the aerial vehicle, and a weight capacity of the aerial vehicle.

4. The computer-implemented method of claim 1, wherein the method further comprises:
generating, by a billing system, a bill for an operator of the first aerial vehicle for the transportation of the first aerial vehicle to the destination by the first land-based vehicle.

5. The computer-implemented method of claim 1, wherein the method further comprises:
receiving, from an operator of the first aerial vehicle, a rating associated with the first land-based vehicle.

6. The computer-implemented method of claim 1, wherein determining the score for each vehicle in the subset of available vehicles further comprises:
analyzing the aerial vehicle information for the first aerial vehicle, wherein the aerial vehicle information comprises data related to a route for the first aerial vehicle; and
generating, based on the data related to the route for first aerial vehicle and the land-based vehicle information for the subset of available vehicles, a value for each vehicle in the subset of available vehicles, wherein the value for a vehicle indicates an amount of overlap between the route for the first aerial vehicle and a route for the respective vehicle.

7. The computer-implemented method of claim 1, wherein determining to generate a land-based vehicle transportation request for a first aerial vehicle that is performing a delivery comprises:
determining, based on an analysis of the aerial vehicle information, to generate the land-based vehicle transportation request.

8. The computer-implemented method of claim 7, wherein the analysis of the aerial vehicle information further comprises determining that a route of the first aerial vehicle overlaps with a geographical region with weather conditions that are likely to hamper the first aerial vehicle to perform the delivery.

9. The computer-implemented method of claim 7, wherein the analysis of the aerial vehicle information further comprises determining that a route of the first aerial vehicle would cause the first aerial vehicle to exit an operational range of the first aerial vehicle; and
in response to determining that the route of the first aerial vehicle would cause the first aerial vehicle to exit the operational range of the first aerial vehicle, generating the land-based vehicle transportation request.

10. A non-transitory computer-readable medium storing one or more instructions executable by a computer system to perform operations comprising:

registering one or more aerial vehicles and one or more land-based vehicles with a last mile delivery system, wherein the one or more aerial vehicles and the one or more land-based vehicles are associated with aerial vehicle information and land-based vehicle information, respectively;

establishing a first network connection between the last mile delivery system and an aerial vehicle from the one or more aerial vehicles and a second network connection between the last mile delivery system and a land-based vehicle from the one or more land-based vehicles;

determining to generate a land-based vehicle transportation request for a first aerial vehicle that is performing a delivery;

selecting, in response to generating the land-based vehicle transportation request, a first land-based vehicle that accepts the land-based vehicle transportation request to fulfill a request for transportation received from the first aerial vehicle, wherein selecting the first land-based vehicle comprises:

identifying a subset of available vehicles from the one or more land-based vehicles, wherein each vehicle in the subset of available vehicles is available to fulfill the request for transportation received from the first aerial vehicle;

determining, based on the land-based vehicle information for the subset of available vehicles and aerial vehicle information for the first aerial vehicle, a score for each vehicle in the subset of available vehicles, wherein the score for a respective vehicle indicates a likelihood of the respective vehicle to fulfill the land-based vehicle transportation request; and selecting, based on the scores for the subset of available vehicles, the first land-based vehicle from the subset of available vehicles;

matching, based on the land-based vehicle transportation request and the land-based vehicle information, the first aerial vehicle with the first land-based vehicle; and generating and sending transportation instructions to the first aerial vehicle and the first land-based vehicle, wherein the transportation instructions comprise: (i) a starting location where the first aerial vehicle docks to the first land-based vehicle, and (ii) a destination to which the first land-based vehicle transports the first aerial vehicle, wherein the land-based vehicle transportation request causes the first land-based vehicle to transport the first aerial vehicle according to the request for transportation, and wherein determining to generate the land-based vehicle transportation request for the first aerial vehicle that is performing a delivery comprises:

receiving, over the first network connection, the request for transportation, the request being transmitted from the first aerial vehicle to the last mile delivery system.

11. The non-transitory computer-readable medium of claim 10, wherein determining to generate a land-based vehicle transportation request for a first aerial vehicle that is performing a delivery comprises:

determining, based on an analysis of the aerial vehicle information, to generate the land-based vehicle transportation request.

12. The non-transitory computer-readable medium of claim 10, wherein the land-based vehicle information comprises, for each of the one or more land-based vehicles, at least one of: a vehicle profile, a real-time location, a destination, or a planned route information.

13. The non-transitory computer-readable medium of claim 10, wherein the aerial vehicle information comprises, for each of the one or more aerial vehicles, at least one of: an aerial vehicle profile, a real-time location, a destination, a planned route information, a range of the aerial vehicle, a speed of the aerial vehicle, and a weight capacity of the aerial vehicle.

14. The non-transitory computer-readable medium of claim 10, wherein the operations further comprise:

generating, by a billing system, a bill for an operator of the first aerial vehicle for the transportation of the first aerial vehicle to the destination by the first land-based vehicle.

15. The non-transitory computer-readable medium of claim 10, wherein the operations further comprise:

receiving, from an operator of the first aerial vehicle, a rating associated with the first land-based vehicle.

16. A system, comprising:

one or more processors; and a non-transitory computer-readable storage medium coupled to the one or more processors and storing programming instructions for execution by the one or more processors, the programming instructions instructing the one or more processors to perform operations comprising:

registering one or more aerial vehicles and one or more land-based vehicles with a last mile delivery system, wherein the one or more aerial vehicles and the one or more land-based vehicles are associated with aerial vehicle information and land-based vehicle information, respectively;

establishing a first network connection between the last mile delivery system and an aerial vehicle from the one or more aerial vehicles and a second network connection between the last mile delivery system and a land-based vehicle from the one or more land-based vehicles;

determining to generate a land-based vehicle transportation request for a first aerial vehicle that is performing a delivery;

selecting, in response to generating the land-based vehicle transportation request, a first land-based vehicle that accepts the land-based vehicle transportation request to fulfill a request for transportation received from the first aerial vehicle, wherein selecting the first land-based vehicle comprises:

identifying a subset of available vehicles from the one or more land-based vehicles, wherein each vehicle in the subset of available vehicles is available to fulfill the request for transportation received from the first aerial vehicle;

determining, based on the land-based vehicle information for the subset of available vehicles and aerial vehicle information for the first aerial vehicle, a score for each vehicle in the subset of available vehicles, wherein the score for a respective vehicle indicates a likelihood of the respective vehicle to fulfill the land-based vehicle transportation request; and selecting, based on the scores for the subset of available vehicles, the first land-based vehicle from the subset of available vehicles;

matching, based on the land-based vehicle transportation request and the land-based vehicle information, the first aerial vehicle with the first land-based vehicle; and generating and sending transportation instructions to the first aerial vehicle and the first land-based vehicle, wherein the transportation instructions comprise: (i) a starting location where the first aerial vehicle docks to the first land-based vehicle, and (ii) a destination to which the first land-based vehicle transports the first aerial vehicle, wherein the land-based vehicle transportation request causes the first land-based vehicle to transport the first aerial vehicle according to the request for transportation, and wherein determining to generate the land-based vehicle transportation request for the first aerial vehicle that is performing a delivery comprises:

receiving, over the first network connection, the request for transportation, the request being transmitted from the first aerial vehicle to the last mile delivery system.

17. The system of claim 16, wherein determining to generate a land-based vehicle transportation request for a first aerial vehicle that is performing a delivery comprises:

determining, based on an analysis of the aerial vehicle information, to generate the land-based vehicle transportation request.

18. The system of claim 16, wherein the land-based vehicle information comprises, for each of the one or more land-based vehicles, at least one of: a vehicle profile, a real-time location, a destination, or a planned route information.

19. The system of claim 16, wherein the aerial vehicle information comprises, for each of the one or more aerial vehicles, at least one of: an aerial vehicle profile, a real-time location, a destination, a planned route information, a range of the aerial vehicle, a speed of the aerial vehicle, and a weight capacity of the aerial vehicle.

20. The system of claim 16, wherein the operations further comprise:

generating, by a billing system, a bill for an operator of the first aerial vehicle for the transportation of the first aerial vehicle to the destination by the first land-based vehicle.

\* \* \* \* \*